United States Patent
Najm et al.

[11] Patent Number: 6,122,041
[45] Date of Patent: Sep. 19, 2000

[54] LIQUID COOLED LIGHT PIPE ASSEMBLY FOR PYROMETRIC TEMPERATURE MEASUREMENT

[75] Inventors: Habib Najm, Pleasanton, Calif.; Mehrdad M. Moslehi, Mountain View, Calif.

[73] Assignee: Texas Instruments Incorporated, Dallas, Tex.

[21] Appl. No.: 08/942,564

[22] Filed: Oct. 1, 1997

Related U.S. Application Data

[63] Continuation of application No. 07/973,362, Nov. 9, 1992, abandoned.

[51] Int. Cl.[7] .................................................... G01J 5/04

[52] U.S. Cl. ...................................................... 356/43

[58] Field of Search .................................. 356/43

[56] References Cited

U.S. PATENT DOCUMENTS 5,092,680  3/1992  Kobayashi et al. .

FOREIGN PATENT DOCUMENTS 0085143  8/1983  European Pat. Off. .

*Primary Examiner*—Richard A. Rosenberger
*Attorney, Agent, or Firm*—Robby T. Holland; Jacqueline Garner; Richard L. Donaldson

[57] ABSTRACT

A liquid cooled light pipe is disclosed which allows effective pyrometric temperature measurements using a remote detector. Temperature of the light pipe assembly is controlled and maintained at an approximately constant value in order to establish good long-term temperature measurement accuracy. The temperature-controlled light pipe assembly of this invention can be used for multi-point temperature measurements of a heated body with good spatial resolution for real-time multi-zone temperature control applications.

2 Claims, 4 Drawing Sheets

LIQUID COOLED LIGHT PIPE ASSEMBLY FOR PYROMETRIC TEMPERATURE MEASUREMENT

This application is a continuation of application Ser. No. 07/973,362, filed on Nov. 9, 1992, of Najm, et al. for Liquid Cooled Light Pipe Assembly for Pyrometric Temperature Measurement now abandoned.

BACKGROUND OF THE INVENTION

The use of pyrometry for non-invasive temperature measurement and control is a necessity for some semiconductor processing applications such as Rapid Thermal Processing (RTP). Pyrometry involves measuring light emission from a silicon wafer using an infrared detector in a specified spectral band and to compute wafer temperature based on the measured radianie data. An important aspect of the pyrometric setup is the means by which light is collected from the wafer and transferred to the detector. The mounting of the pyrometer/detector somewhat away from the immediate vicinity of the process chamber window is desired to minimize the ambient temperature changes in the detector hardware. Moreover, advanced multi-zone temperature control methods require multi-point sensors which can provide good spatial resolution for mapping the wafer temperature. Hence, a light pipe has been used, especially where other equipment or space constraints require the pyrometer to be at some distance from the chamber process window. Light pipes have been used previously in semiconductor processing reactors. In some instances a simple hollow light pipe is used, i.e. the pyrometer looks at the wafer through a hollow pipe. Other applications have used a bare sapphire rod extended into the process chamber as a light pipe. In the former case the signal level is degraded because of the inevitable small angle of view and the small amount of light collected. Moreover, hollow light pipes can cause measurement error and drift due to the fact that the effective light pipe transmission is affected by the reflectivity of the light pipe wall. The latter approach, while it does maintain an acceptable signal level, is susceptible to measurement noise introduced by the direct heating of the light pipe material. The change in refractive index of the light pipe material, e.g. sapphire, at the operating wavelength range, with temperature, can cause significant temperature measurement errors unless corrected for. Further, the relatively high temperature that the light pipe is subjected to may preclude certain materials, than sapphire, from being utilized in the light pipe, e.g. fluoride or chalcogenide glass fibers. Moreover, the light pipes of prior art (e.g., sapphire rod) do not provide the spatial resolution necessary for multi-point wafer temperature measurements.

DETAILED DESCRIPTION OF THE INVENTION

Figures 1A, 1B:
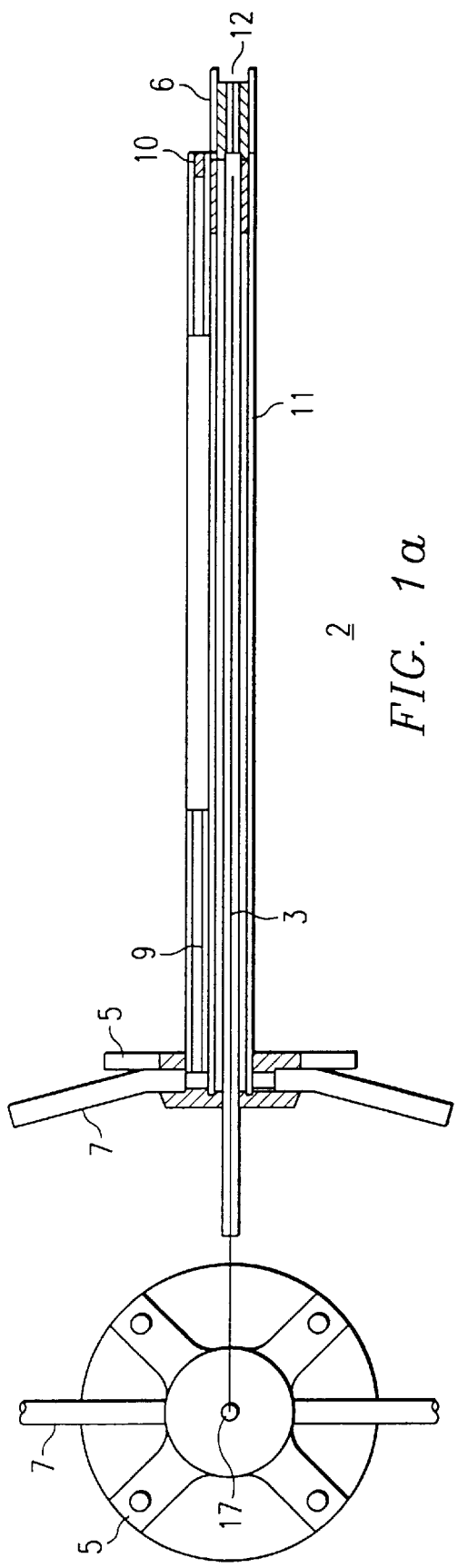
FIG. 1a illustrates a cross-sectional view of the inventions' light pipe assembly.
FIG. 1b illustrates a front view of the invention's light pipe assembly.
Figure 2:
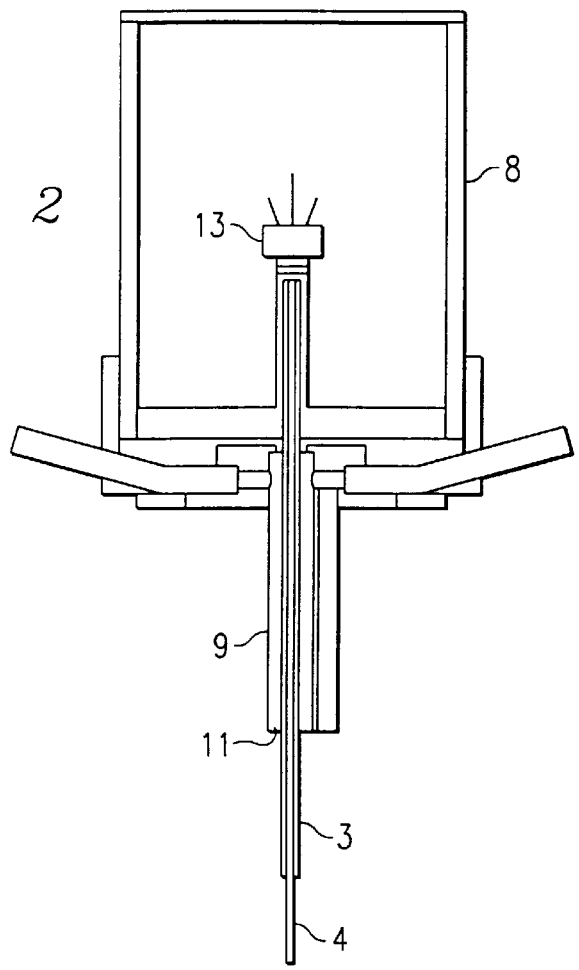
FIG. 2 illustrates a cross-sectional view of the pyrometer section of the light pipe assembly.

A first preferred embodiment of the invention is shown in FIG. 1a which illustrates a cross-sectional view of the liquid cooled light pipe assembly 2 of this invention. The light pipe itself can be constructed from light transmissive media such as a sapphire rod or a suitable fiber optic bundle. The fiber-optic bundle may be constructed from a suitable infrared transmitting fiber material such as chalcogenide, fluoride, and/or silver halide. In its preferred embodiment, light pipe 4 is fitted inside a 12-inch long stainless steel tube 3 having an outer diameter of ⅛ inches. Light pipe 4 extends to the tip of copper end section 6 which is approximately ¼ of an inch in diameter. FIG. 1b illustrates a front view of light pipe assembly 2 illustrating mounting flanges 5 and cooling liquid tube 7 (these elements are also illustrated in FIG. 1a). The pyrometer and filter section 8 of assembly 2 is fitted at one end of light pipe 4 as shown in FIG. 2 which illustrates a detailed cross-sectional view of the pyrometer and filter (which filters signals traveling along the light pipe to detector 13). Detector 13 fits onto a mount 17 as shown in FIG. 1b. Cooling liquid, such as water, is pumped through the annular clearance, water jacket 11, between ⅛ inch diameter tube 3 and a surrounding concentric ⅜-inch in diameter tube 9. With reference back to FIG. 1a, liquid extends down to joint 10 of copper end section 6, and exits via a side tube mounted parallel to ⅜ inch tube 9. Copper is preferably used in end section 6 because it can provide high thermal conductivity between the cooling liquid and light pipe tip 12, thus ensuring an acceptable low tip temperature. This provision ensures long-term integrity of the overall light pipe assembly.

Figure 3:
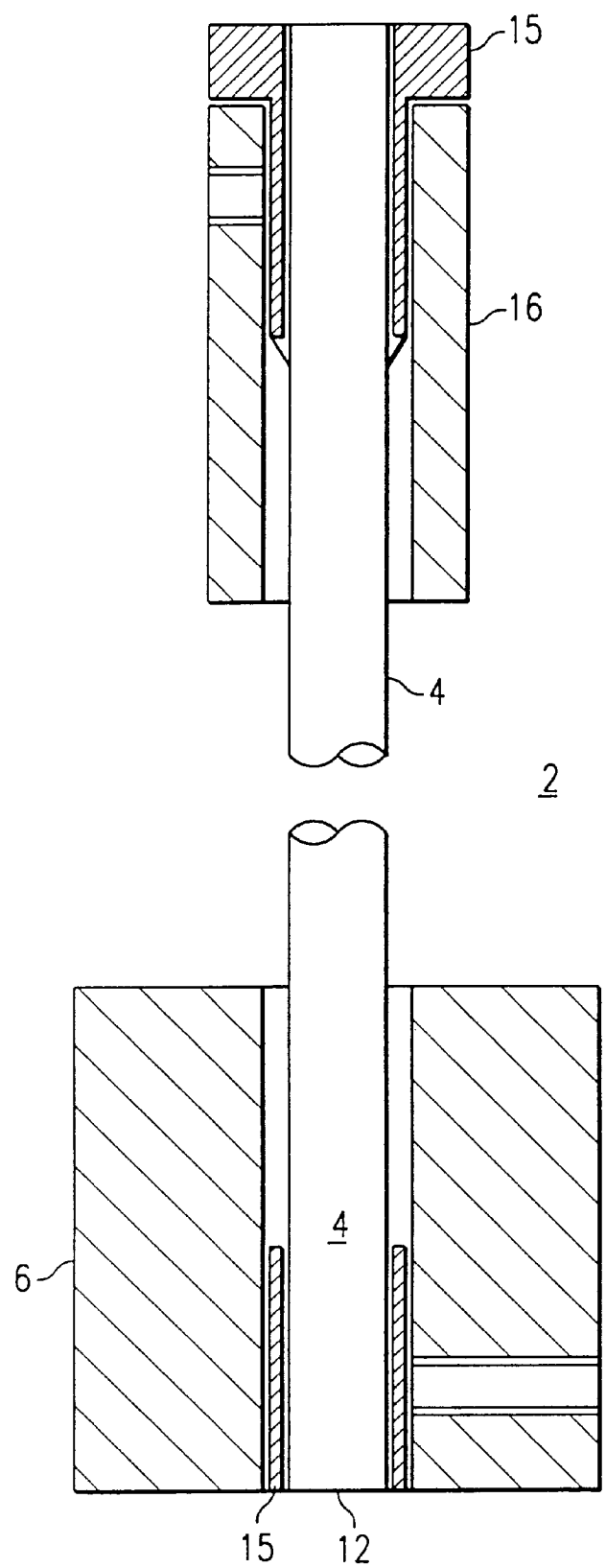
FIG. 3 illustrates a cross-sectional view of a portion of the light pipe assembly showing the light pipe held in place by metallic spacers.

With reference to FIG. 3 which illustrates a cross-sectional view of a portion of light pipe assembly 2, light pipe 4 is held at the two ends of assembly 2 by metallic spacers 15 that are held in place by miniature 0.080 set screws. The total outer diameter of assembly 2 is maintained at ⅛ inch at detector end 16 of light pipe assembly 2 while the outer diameter near light pipe tip 12 is approximately ¼ of an inch in diameter.

Figure 4A:
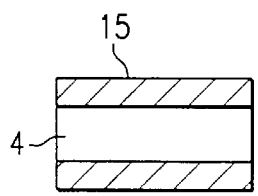
FIGS. 4a and 4b illustrate cross-sectional views of the light pipe assembly including metallic spacers.
Figure 4B:
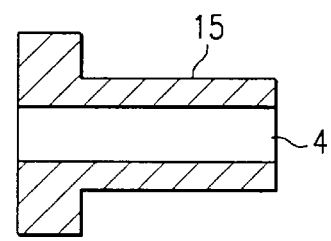

In the first preferred embodiment of the invention, the top spacer is epoxied to the light pipe, and it provides the main support for the light pipe weight. The lower spacer is used to ensure good thermal contact between the light pipe mass and the surrounding cooled metal. In an alternative embodiment, the light pipe is constructed of fiber-optic light pipe material such as silver halide. Still alternatively, the fiber optic light pipe material can be made of fluoride or chalcogenide glass. For a silver halide light pipe, it is desirable that each of the two spacers 15 have a small taper at one end so that the fiber-optic light pipe 4 cannot pass out of the spacer at either end of the assembly 2 as shown in FIGS. 4a and 4b, drawings which illustrate cross-sectional views of portions of the light pipe assembly including metallic spacers 15. Spacers 15 are gold coated to prevent corrosion by the fiber material, since silver halide is corrosive to most metals except gold, platinum, and other noble metals.

Figure 5:
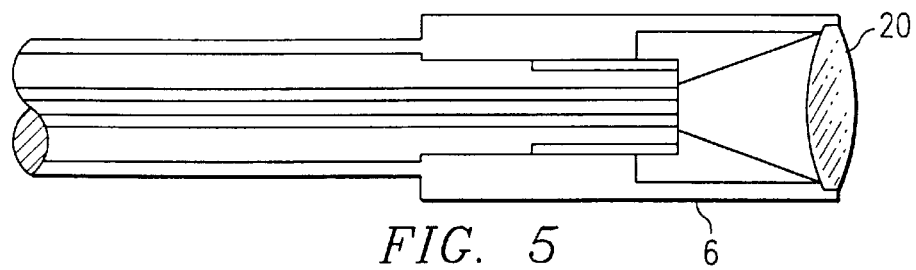
FIG. 5 illustrates a cross-sectional view of a second preferred embodiment of the invention wherein the light pipe termination at the tip of the copper end contains a sapphire lens.

FIG. 5 illustrates a cross-sectional view of a second preferred embodiment of the invention wherein the light pipe termination at the tip of the copper end section 6 contains an infrared lens such as a sapphire lens 20 fitted at the tip to focus an area of collected light onto a single or multiple fiber bundle arranged behind the lens at its focus. This embodiment provides for a well defined area on the wafer from which light is collected, and allows for independent temperature measurements at multiple locations across the wafer with good spatial resolution.

Figure 6:
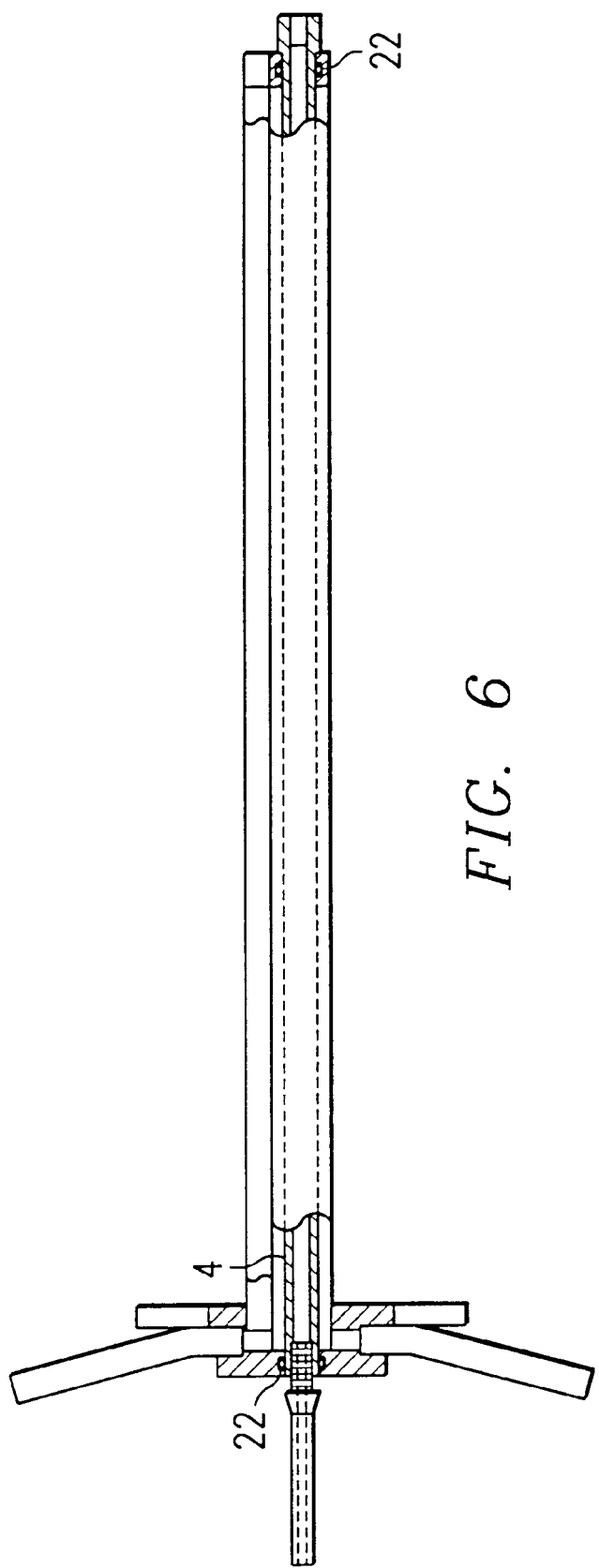
FIG. 6 illustrates a cross-sectional view of a third preferred embodiment of the invention which has a removable light pipe.

FIG. 6 illustrates a cross-sectional view of a third preferred embodiment of the invention which has a removable light pipe. As shown, light pipe 4 fits inside O-rings 22. A Black teflon™ tip or other similar suitable plastic tip is added at the top of the light pipe 4 near the detector section. As shown, the light pipe 4 is copper over most of its length. The end section of light pipe 4 at the detector end is, as indicated, made of plastic. The material choice can include any suitable electrically insulating material. This tip mates with the optical detector, and being electrically insulating, provides protection against electromagnetic noise, carried by the other metallic components in the light pipe assembly. An electrically conducting tip would transmit this noise to the detector causing significant noise in the measurement. The removable feature of this embodiment is realized by sliding light pipe 4 out of O-rings 22 from the right end of the light pipe assembly. Light pipe 4 can be placed into the light pipe assembly by sliding light pipe 4 into O-rings 22 from the right end of the light pipe assembly. Light pipe 4 is tapered out at its left plastic end as shown to prevent tearing of O-rings 22 during removal or insertion of light pipe 4 into light pipe assembly 2.

Although the invention has been described in detail, it is to be understood that this description is by way of example only, and it is not to be construed in a limiting sense. It is to be further understood that numerous changes in the details of the embodiments of the invention, and additional embodiments of the invention will be apparent to and may be made by persons of ordinary skill in the art having reference to this description. It is contemplated that all such changes, additions, and adaptations are well within the spirit and true scope of the invention as claimed below. Accordingly, the invention is intended to be limited only by the scope of the appended claims.

What is claimed is:

1. A temperature-controlled light pipe assembly for multi-zone optical sensing applications comprising:

a light transmitting fiber, a detector at a first end of said light transmitting fiber, a sensing tip at a second end of said light transmitting fiber, a first tube for holding said light transmitting fiber, a second tube concentric with said first tube for holding a liquid to cool said light transmitting, and a spacer at said first and second ends, wherein said spacer is tapered at at least one end.

2. A temperature-controlled light pipe assembly for multi-zone optical sensing applications comprising:

a light transmitting fiber;

a detector at a first end of said light transmitting fiber;

sensing tip at a second end of said light transmitting fiber;

a first tube for holding said light transmitting fiber; and a second tube concentric with said first tube for holding a liquid to cool said light transmitting fiber, wherein said light transmitting fiber mounts within said assembly via O-rings located near opposite ends of said assembly.

* * * * *